(12) United States Patent
Wolff et al.

(10) Patent No.: US 7,297,647 B2
(45) Date of Patent: Nov. 20, 2007

(54) LEAD- AND ARSENIC-FREE OPTICAL LANTHANUM FLINT GLASSES

(75) Inventors: Silke Wolff, Hueckeswagen (DE); Karl Mennemann, Taunusstein (DE); Ute Woelfel, Mainz-Laubenheim (DE)

(73) Assignee: Schott AG, Mainz (DE)

( * ) Notice: Subject to any disclaimer, the term of this patent is extended or adjusted under 35 U.S.C. 154(b) by 45 days.

(21) Appl. No.: 11/067,495

(22) Filed: Feb. 28, 2005

(65) Prior Publication Data

US 2005/0209087 A1  Sep. 22, 2005

(30) Foreign Application Priority Data

Feb. 26, 2004  (DE)  .................. 10 2004 009 930

(51) Int. Cl.
*C03C 3/066* (2006.01)
*C03C 3/068* (2006.01)

(52) U.S. Cl. ................... 501/78; 501/79; 501/903
(58) Field of Classification Search .......... 501/78, 501/79, 903
See application file for complete search history.

(56) References Cited

U.S. PATENT DOCUMENTS 6,753,278 B2 *  6/2004  Wolff et al. ............. 501/51

FOREIGN PATENT DOCUMENTS

| DE | 3130066 | * | 2/1983 |
|---|---|---|---|
| DE | 3307497 | * | 6/1984 |
| DE | 3500578 | * | 10/1986 |
| JP | 56-41850 | * | 4/1981 |
| JP | 56041850 A | | 4/1981 |
| JP | 56-160340 | | 12/1981 |
| JP | 57-056344 | * | 4/1982 |
| JP | 57056344 A | | 4/1982 |
| JP | 08-059282 | | 3/1996 |

* cited by examiner

*Primary Examiner*—Karl E Group
(74) *Attorney, Agent, or Firm*—Millen, White, Zelano & Branigan, P.C.

(57) ABSTRACT

The present invention relates to lead and arsenic free optical glasses, used for the application areas imaging, digital projection, photolithography, laser technology, wafer/chip technology as well as telecommunication, optical communications engineering, optics, illumination and in the automotive sector. The glasses have a refraction power of from $1.73 \leq n_d \leq 1.82$ and an Abbé value of $43 \leq v_d \leq 53$ with good chemical consistency and excellent crystallisation stability with the following composition (in weight-%):

| | |
|---|---|
| $SiO_2$ | 0.1-5.5 |
| $B_2O_3$ | 27-35 |
| $La_2O_3$ | 42-48 |
| $BaO$ | 0-5 |
| $ZnO$ | 0.5-5 |
| $Y_2O_3$ | 6-12 |
| $TiO_2$ | 0-4 |
| $ZrO_2$ | 4-10 |
| $Nb_2O_5$ | 0-5 |
| $WO_3$ | 0-5. |

14 Claims, No Drawings

LEAD- AND ARSENIC-FREE OPTICAL LANTHANUM FLINT GLASSES

BACKGROUND OF THE INVENTION

The present invention concerns to lead- and arsenic-free optical lanthanum flint glasses characterized by their optical position with a refraction power of $1.73 \leq n_d \leq 1.82$ and an Abbé value of $43 \leq V_d \leq 53$ as well as their use.

The development of the market in the field of the so called "optical data transfer" trends increasingly to smaller devices which are still effective and which could consequently achieve more and more higher data transfer rates. This trend is also finding in the application fields imaging, digital projection, photo lithography, laser technology, wafer/chip technology as well as for the telecommunication, optical communication engineering and optical/illumination in the automotive sector.

Further, in all sectors of this application field the traditional "read only technology" is more and more displaced by the "read & write technologies". Therefore, the requirements on the optical systems and thus on the optical material are changing.

While the "read only technologies" can be operated based on the separation in the two spatiotemporal strictly separated operating mode (writing and respectively reading) in the monochromatic mode and therefore the writing process could be carried out with light of the same wave length as well as the reading process, which could only carried out in the later operation, this is not possible for the "read & write technologies". At this juncture, the wave length of the "writing jet" has to diverge from the wave length of the "laser jet" about at least 2-5 nm to lower values. Otherwise, not both modes in one optical head could be operated in the device. If a writing head and a reading head are necessary, this means that two different heads have to be combined in one device, and the technical effort as well as further the size and at least the costs of such devices would be unacceptable.

The wavelength differentiation results from the necessity to separate the reading- and writing jet in the optical system to exclude important aberration by interference- and low light level effects. The lower the difference of both wavelengths can be kept while maintaining the necessary total separation, the easier such an optical system is realize. In this case, the term "easy" concerns to the amount of the necessary optical components and therefore both, the minimal overall size of the module as well as the costs.

However, the minimal wavelength difference as may be necessary for the complete division depends on the dispersion of the glass components in the optical system. The higher the dispersion (and therefore the lower the Abbé coefficient), the further the both respective monochromatic jets are fan out and respectively broadened, till they finally interfere, which is contradictory to the aspired division. In reverse this means for glasses with this application intention: With diminishing dispersion, only low wavelength differences may be converted, which correspond to the aspired intention of a cheap product.

Besides this improvement, a further improvement results from the low dispersion: It is possible to work with clearly lower wavelengths based on in principle identical wavelength differences in absolute terms. In general, the dispersion has a higher effect to rays with declining wavelengths.

In addition to the disadvantage of the larger minimal wavelength difference of conventional glasses with a higher dispersion, also an undesirable increased absolute wavelength, as compared to low dispersive glass types, follows.

A low absolute wavelength region of operation is favoured again in view of the application of the complete systems: The lower the operating wavelengths, the higher the achievable information packing density (relating to the unit of area of the data carrier material) are formed. In addition to the maximized information density, the access time is also optimized by shorter ways, namely reduced.

Also, the refraction power position has an important influence to the practical property of such a complete system: The actual "Pick up lenses" are defining with their refraction on power, both, the absolute wavelength region of operation of the combined write-read jets as well as the focal length of the system. As to the focal length, the interrelationship is as follows: The lower the focal length of such a system, the lower is there geometric dimension, which results directly in the component size and therefore massive in weight and costs. Therefore, a higher refraction power in the important wavelength range is desired.

Besides, this is comparable for optical components of all above mentioned application areas. A further advantage of a high refraction power is the possibility to coat "pick up lenses" aspherical: The lower the transmission property of the glass at the operating wavelength, the poorer is the yield of the light in the system. The light intensity has a direct influence to the writing-reading quality of the systems. The poorer the yield of the light, the higher must be the efficiency of the light source, and due to this there are additional refrigerating sets necessary, resulting in costs and expenditure of unacceptable ranges.

It is known, that high transmissions in the wavelengths working range of all optical systems are of particular importance. The lower the transmissivity of the glasses are at the working wavelengths, the more worst is the yield of the light of the system. However, the illuminance goes directly in the write-read quality of the systems. The more worst the illuminance, the higher the efficiency of the light source has to be, whereby the additional cooling units are required again, following in costs and expense in an unacceptable range.

Additional to the optical values, also physical and chemical parameters are specified for glasses for the use in the above described application. These parameters are the low specific density and the good coating property, whereas these both conditions are leading to a restriction of the composition of the glasses to defined components.

The specific density of the optical materials of these systems is very important. The "pick up lenses" as a component of the combined write-read head is movable elements of the system. The heads are moving for the actual data transfer above the data carrier. Therefore, the access times and the track densities are depending on the possibility of the fast and exact positioning of the heads. Thus, the higher the specific density of the glass building components, the higher is the mass of the mobile unit, which is then more inert and therefore slower in positioning. Due to this, the specific density of the glasses according to the present invention should be low.

For many application areas, the reduction of the mobile mass of the glasses according to the present invention is very important. The "handiness" of lens systems, for example for photography, the projection and in future for the glass fiber technology and glass building component technology (e.g. for the use in the area of mobile optical computer like for example optical lap tops), is a important criteria.

The aspherical coating of the Pick-Up lenses is organic chemical nature, like the common coatings of optical lenses and prisms. To obtain an adequate bonding of the optical layer on the basic glass, the glass material should contain components, which allow a strong bond to organic materials.

Regarding to the aspect of materials procession concerning molten mass/hot forming, there is an increasing requirement for so called "short" glasses, whereby these are glasses whose viscosity are variegating strong depending on temperature. This attitude shows the advantage during the process that the times for the hot forming; the "form fit times" could be shortened. Therefore, the throughput is increased and at the same time the forming material is treated with care, which has an extremely positive effect to the total production costs. Also, glasses with a stronger crystallisation gradient could be better processed since due to higher throughput a faster cooling down is possible. Therefore, problems are avoided, which occurs on "longer" glasses, like pre germination with following difficulties at the secondary hot forming.

DESCRIPTION OF THE PRIOR ART

The prior art describes glasses, which cannot satisfy the above described requirements. In fact, these glasses are showing significant disadvantages:

The Japanese Specification JP 08-059282 describes glasses of the lanthanum borate glass system with decreased processing temperature for the purpose of the precision hot forming, i.e. end-geometry-close hot forming in the primary hot forming step. Such glasses are not very stable in crystallization and have a viscosity with a strong dependency to the temperature. For this purpose the glasses of this document are containing alkali metal oxides (common fluxing agents) up to 12.5 w/w in sum, there under compulsory $LiO_2$ wit up to 2.5 w/w. The application of these components effects the before mentioned decrease of the crystallisation stability in these glasses.

DE 3102690 refers to lanthanum borate glasses containing high amounts of niobium with a high refraction power and a very low Abbé coefficient at the same time, i.e. lanthanum heavy flint types. Similar glasses are described in the documents JP 56-160340 and JP 50-014712. If the borate contents (for the stabilization of the glass matrix) are too high for the desired refraction power position, high contents of expensive components have to be used, which is disadvantageous.

According to DE 3102690, for the increase of the refraction power up to 8 w/w PbO are used, which is very harmful for health and environment.

JP 61-012856 discloses glasses for photography with a high transmission in the UV-range. The glasses are related to the lanthanum borate glass system ($La_2O_3$ 20-50 w/w; $B_2O_3$, 17-45 w/w) with compulsory fractions of tin oxide (up to 4 w/w) and ytterbium oxide (up to 35 w/w). Due to these components, the glasses are expected to be expensive.

DE 1061976 describes glasses containing high amounts of lanthanum ($La_2O_3$ 22.5-85 w/w) for achieving a high refractive index, but sets further value on a matrix containing high amounts of silica ($SiO_2$ 5-40 w/w) in addition to lanthanum realising borate ($B_2O_3$, 2.5-45 w/w). However, the silica leads to crystallization problems and the glasses do not at all fulfill present requirements of usability.

The Japanese document JP 52-063211 concerns high dispersive lanthanum heavy flint glasses, which contain at least 2 percent by weight $TiO_2$ with a maximum use of 19 percent by weight. In combination with an extremely unfavourable relation up to 26.5 of $La_2O_3/B_2O_3$, a very strong and undesirable potential of crystallization is generated.

BRIEF DESCRIPTION OF THE INVENTION

It is the object of the present invention to provide glasses which do not show the disadvantages of the glasses according to the prior art and do satisfy all the above mentioned requirements. Summarized, these are: high refractive index at low dispersion, a low specific density with simultaneously excellent transmission properties.

The object is solved by glasses as described in the claims. The glasses according to the present invention show high Abbe values, corresponding to a low dispersion, still further high refractive indices (determined as $n_d$) and a low specific density.

According to a preferred embodiment, the glasses comprise small portions on tungsten oxide and show very good transmission properties in the visible light range, particularly for blue light and additional also a very good UV transmission. Further, the glasses according to the present invention are characterized by a good chemical resistance and workability, by satisfactory crystallization stability as well as a good environmental compatibility. The latter is achieved such, that the glasses do neither comprise PbO nor $As_2O_3$. Further, the glasses according to the present invention could ensure that organic materials are adhering excellent on the glasses, which is achieved by the addition of silica.

DETAILED EMBODIMENTS OF THE INVENTION

EXAMPLE 1

A glass according to the present invention can be described by the following composition (in percent by weight (abbreviated hereinafter as "w/w" [weight/weight]) based on the oxides):

TABLE 1

| | |
|---|---|
| $SiO_2$ | 0.1-5.5 |
| $B_2O_3$ | 27-35 |
| $La_2O_3$ | 42-48 |
| BaO | 0-5 |
| ZnO | 0.5-5 |
| $Y_2O_3$ | 6-12 |
| $TiO_2$ | 0-4 |
| $ZrO_2$ | 4-10 |
| $Nb_2O_5$ | 0-5 |
| $WO_3$ | 0-5 |

Additionally, they could comprise a common refine agent, and still further a maximum portion of 8 w/w alkali metal oxides (without $Li_2O$) and in sum a maximum of 8 w/w (MgO+CaO+SrO). Arsenic refine agents are in this connection undesirable.

The above shown glasses according to the present invention satisfy the requirements of good melting and processability properties at a refraction power of $1.73 \leq n_d \leq 1.82$ and an Abbé value of $43 \leq V_d \leq 53$, show a good chemical resistance and are stable to crystallization, while simultaneously the disadvantageous components PbO and $As_2O_3$ are absent.

The above table shows that the glass system could be classified as a lanthanum borate glass. The borate provides the solubility of the lanthanum. For respective ratios of preferably $La_2O_3 : B_2O_3 \leq 1.8$, stable glasses can be expected, particularly preferred are ratios of $\leq 1.6$ and even more preferred ratios less than or equal to 1.5. At a ratio of $La_2O_3$ to $B_2O_3$ of 1.39, for an amount of 31 percent by weight of $B_2O_3$ only 43 percent by weight of $La_2O_3$ can be used. The required refraction power can be provided by the addition of $ZrO_2$. $Y_2O_3$ can be used to decrease the tendency to crystallize. In addition, this glass system contains only low portions of the glass builder $SiO_2$ (0.1-5.5 percent by weight, preferably 0.1-4.9 percent by weight, particularly preferred 0.5-4 percent by weight). This leads to an improvement of the workability by increasing the mechanical strength of the material. Therefore, good abrasion resistances and chemical resistances could be achieved in correlation to the used amount (e.g. AR=1). The addition of $SiO_2$ should be restricted to the above shown maximum value.

Alkalis are designated optional for specific adjustments in the light of the application field, such as for example ion exchange property, or slight variations of the behaviour of the viscosity depending upon temperature for the benefit of flexible, end-geometry-close hot forming, which can also be achieved by the optional use of the alkaline earth metal oxides MgO, CaO and SrO.

An important component for achieving the special optical position with a high refraction power at a small Abbe coefficient is $Y_2O_3$ (6-12 w/w, preferably 7-11 w/w). Further, $Y_2O_3$ is stabilizing the silica containing lanthanum borate glass matrix.

$TiO_2$, which is limited to a maximum of 4 percent by weight, may cause in combination with the earth alkali metal oxides and ZnO (ZnO=0.5-5 w/w, preferably 0.5-4 w/w, particularly preferred 1-4 w/w; BaO: 0-5 w/w, preferably 0.1-3 w/w, particularly preferred 1-3 w/w; with $\Sigma$(MgO+CaO+SrO)=0-8 w/w and with $\Sigma$(MgO+ZnO)=0.5-10 w/w) the "shortness" of the glass. Preferred embodiments are free of $TiO_2$.

Mainly, the use of the earth alkali metal oxides is serving, in combination with $TiO_2$, for the modification of the viscosity temperature profile. Due to the fact that these components also may influence the sensible optical position, MgO and CaO as deep refracting components are particularly limited (0-8 w/w, preferred variants are free of them). Therefore, the higher refracting components BaO (0-5 w/w, preferably 0.1-3 w/w, particularly preferred 1-3 w/w) and ZnO (0.5-5 w/w, preferably 0.5-4 w/w, particularly preferred 1-4 w/w) are preferred. Particularly preferred is ZnO since it has the character of a crystallization inhibitor.

$Nb_2O_5$ is suited to inhibit crystallization by an antagonistic effect as to seed crystal content. $Nb_2O_5$ can be present in the formulations according to the invention in amounts of from 0 to 5 w/w, preferable 0.5 to 4 w/w, more preferred 1 to 4 w/w. Alternatively, the glasses contain no $Nb_2O_5$.

The optionally used component $WO_3$ is suited for the fine tuning of the optical position. In preferred embodiments, $WO_3$ is present in amounts up to 5 w/w, more preferred from 0-3 w/w, still further preferred from 0.1 to 3 w/w and most preferred from 0.1 to 2 w/w.

EXAMPLE 2

Table 2 shows 7 glasses with preferred amounts of used components.

The glasses according to the present invention can be produced as follows:

The starting materials for the oxides, preferably carbonates, nitrates and/or fluorides are weighted, one or more refining agents, like e.g. $Sb_2O_3$, are added and afterwards well mixed. The batch is melted at approximately 1300° C. in a continuous melting aggregate, than refined (1350° C.) and homogenized. The glass is cast with a cast temperature of approximately 1220° C. and processed to the desired dimensions.

| Melting example for 100 kg of calculated glass (table 1a) | | | |
|---|---|---|---|
| Oxide | Percent by weight (w/w) | Starting material | Weighted sample (kg) |
| $SiO_2$ | 0.1 | $SiO_2$ | 0.09 |
| $B_2O_3$ | 27.0 | $H_3BO_3$ | 23.91 |
| | | $B_2O_3$ | 13.65 |
| $La_2O_3$ | 42.0 | $La_2O_3$ | 41.86 |
| BaO | 5.0 | $Ba(NO_3)_2$ | 0.85 |
| | | $BaCO_3$ | 5.78 |
| ZnO | 5.0 | ZnO | 4.99 |
| $Y_2O_3$ | 9.0 | $Y_2O_3$ | 8.97 |
| $ZrO_2$ | 7.0 | $ZrO_2$ | 7.20 |
| $Nb_2O_5$ | 0.5 | $Nb_2O_5$ | 0.50 |
| $WO_3$ | 4.4 | $WO_3$ | 4.39 |
| $Sb_2O_3$ | 0.2 | $Sb_2O_3$ | 0.20 |
| Sum | 100.2 | | 112.39 |

TABLE 2

| | Melting Examples (in w/w) | | | | | | |
|---|---|---|---|---|---|---|---|
| | 1 | 2 | 3 | 4 | 5 | 6 | 7 |
| $SiO_2$ | 4.0 | 0.1 | 2.0 | 0.5 | 3.0 | 3.9 | 1.0 |
| $B_2O_3$ | 35.0 | 27.0 | 31.0 | 33.0 | 29.0 | 30.0 | 32.0 |
| BaO | | 5.0 | 0.5 | 2.0 | | 0.1 | 3.0 |
| ZnO | 1.0 | 5.0 | 0.5 | 1.0 | 4.0 | 0.5 | 2.0 |
| $La_2O_3$ | 48.0 | 42.0 | 43.0 | 47.0 | 43.0 | 44.4 | 45.0 |
| $Y_2O_3$ | 6.0 | 9.0 | 12.0 | 7.0 | 9.0 | 11.0 | 7.0 |
| $ZrO_2$ | 4.0 | 7.0 | 10.0 | 5.0 | 7.0 | 9.0 | 5.0 |
| $Nb_2O_5$ | 2.0 | 0.5 | 1.0 | 4.0 | 3.0 | 1.0 | 2.0 |
| $WO_3$ | | 4.4 | | 0.5 | 2.0 | 0.1 | 3.0 |
| $Sb_2O_3$ | 0.2 | 0.2 | 0.2 | 0.2 | 0.2 | 0.2 | 0.2 |
| $\Sigma$ | 100.2 | 100.2 | 100.2 | 100.2 | 100.2 | 100.2 | 100.2 |
| $n_{d\ 7\ K/h}$ | 1.74249 | 1.79529 | 1.78002 | 1.77286 | 1.78389 | 1.77527 | 1.76956 |
| $V_{d\ 7\ K/h}$ | 51.03 | 46.41 | 48.77 | 47.87 | 46.70 | 49.06 | 48.07 |
| $P_{g,F}$ | 0.5496 | 0.5582 | 0.5523 | 0.5554 | 0.5570 | 0.5520 | 0.5553 |
| $\Delta P_{g,F}$ | −0.0084 | −0.0075 | −0.0095 | −0.0079 | −0.0082 | −0.0093 | −0.0076 |
| $\tau_{25\ mm,\ 390\ nm}$ | 85.4 | 9.9 | 81.9 | 76.2 | 60.4 | 71.5 | 64.4 |

TABLE 2-continued

| | Melting Examples (in w/w) | | | | | | |
|---|---|---|---|---|---|---|---|
| | 1 | 2 | 3 | 4 | 5 | 6 | 7 |
| $\tau_{25\ mm,\ 400\ nm}$ | 88.8 | 11.1 | 86.6 | 81.9 | 65.1 | 73.9 | 73.7 |
| $\tau_{25\ mm,\ 420\ nm}$ | 92.4 | 12.2 | 91.5 | 88.1 | 67.4 | 74.2 | 83.8 |
| $\alpha_{20-300}$ | 6.5 | 7.7 | 7.0 | 7.0 | 6.9 | 7.0 | 7.1 |
| Tg | 674 | 637 | 682 | 662 | 660 | 679 | 652 |
| ρ | 4.02 | 4.50 | 4.24 | 4.20 | 4.28 | 4.22 | 4.25 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 10 2004 009 930.8, filed Feb. 26, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An optical lanthanum flint glass with chemical resistance and stability to crystallization, comprising in percent by weight [w/w]:

| | |
|---|---|
| $SiO_2$ | 0.1 to 5.5 |
| $B_2O_3$ | 27 to 35 |
| $La_2O_3$ | 42 to 48 |
| BaO | 0.1 to 5 |
| ZnO | 0.5 to 5 |
| $Y_2O_3$ | 6 to 12 |
| $TiO_2$ | 0 to 4 |
| $ZrO_2$ | 4 to 10 |
| $Nb_2O_5$ | 0 to 5 |
| $WO_3$ | 0 to 5 | wherein the ratio based on weight of $La_2O_3:B_2O_3$ is $\leq 1.8$, and wherein said glass has a refractive index of $1.73 \leq n_d \leq 1.82$ and an Abbé value of $43 \leq v_d \leq 53$, and is lead and arsenic-free.

2. A glass according to claim 1, wherein the content of $SiO_2$ is 0.1 to 4.9 percent by weight and the content of $Nb_2O_5$ is 0.5 to 5 percent by weight.

3. An optical lanthanum flint glass with chemical resistance and stability to crystallization, wherein the contents in percent by weight are as follows:

| | |
|---|---|
| $SiO_2$ | 0.5 to 4 |
| $B_2O_3$ | 30 to 33 |
| $La_2O_3$ | 43 to 47 |
| BaO | 0.1 to 3 |
| ZnO | 0.5 to 4 |
| $Y_2O_3$ | 7 to 11 |
| $ZrO_2$ | 5 to 9 |
| $Nb_2O_5$ | 1 to 4 |
| $WO_3$ | 0.1 to 3 | wherein the ratio based on weight of $La_2O_3:B_2O_3$ is $\leq 1.8$, and wherein said glass has a refractive index of $1.73 \leq n_d \leq 1.82$ and an Abbé value of $43 \leq v_d \leq 53$, and is lead and arsenic-free.

4. An optical lanthanum flint glass with chemical resistance and stability to crystallization, wherein the contents in percent by weight are as follows:

| | |
|---|---|
| $SiO_2$ | 0.5 to 3 |
| $B_2O_3$ | 30 to 33 |
| $La_2O_3$ | 44 to 47 |
| BaO | 1 to 3 |
| ZnO | 1 to 4 |
| $Y_2O_3$ | 7 to 11 |
| $ZrO_2$ | 5 to 9 |
| $Nb_2O_5$ | 1 to 4 |
| $WO_3$ | 0.1 to 2 | wherein the ratio based on weight of $La_2O_3:B_2O_3$ is $\leq 1.8$, and wherein said glass has a refractive index of $1.73 \leq n_d \leq 1.82$ and an Abbé value of $43 \leq v_d \leq 53$, and is lead and arsenic-free.

5. A glass according to claim 1, further comprising a refine agent with one or more of the following components (w/w)

| | |
|---|---|
| $Sb_2O_3$ | 0-1 |
| SnO | 0-1 |
| NaCl | 0-1 |
| $SO_4^{2-}$ | 0-1 |
| $F^-$ | 0-1 |

6. A lens, prism, light guiding rod, optical fibre, optical window, optical component, an optical component for digital projection, photolithography, stepper, excimer laser, wafer, computer chip, or an integrated circuit or electronic device that encloses such circuit or chip, or a telecommunication, optical communication engineering/information transmission or optic/illumination component in the automotive sector comprising a glass according to claim 1.

7. A glass according to claim 1, wherein the ratio based on weight of $La_2O_3:B_2O_3$ is $\leq 1.6$.

8. A glass according to claim 1, wherein the ratio based on weight of $La_2O_3:B_2O_3$ is $\leq 1.5$.

9. A glass according to claim 1, wherein the ratio based on weight of $La_2O_3:B_2O_3$ is 1.39.

10. A glass according to claim 1, which contains 0.1 to 4 percent by weight of $SiO_2$.

11. A glass according to claim 1, which is free of $TiO_2$.

12. A glass according to claim 1, which has a refractive index $n_d$ of 1.77 to 1.79.

13. A glass according to claim 1, which has an Abbé value $v_d$ of 46 to 49.

14. An optical lanthanum flint glass with chemical resistance and stability to crystallization, which is one of the glasses from the following table where the components are in percent by weight [w/w]

|  |  |  |  |  |  |
|---|---|---|---|---|---|
| $SiO_2$ | 0.1 | 0.5 | 3.0 | 3.9 | 1.0 |
| $B_2O_3$ | 27.0 | 33.0 | 29.0 | 30.0 | 32.0 |
| BaO | 5.0 | 2.0 |  | 0.1 | 3.0 |
| ZnO | 5.0 | 1.0 | 4.0 | 0.5 | 2.0 |
| $La_2O_3$ | 42.0 | 47.0 | 43.0 | 44.4 | 45.0 |
| $Y_2O_3$ | 9.0 | 7.0 | 9.0 | 11.0 | 7.0 |
| $ZrO_2$ | 7.0 | 5.0 | 7.0 | 9.0 | 5.0 |
| $Nb_2O_5$ | 0.5 | 4.0 | 3.0 | 1.0 | 2.0 |
| $WO_3$ | 4.4 | 0.5 | 2.0 | 0.1 | 3.0 |
| $Sb_2O_3$ | 0.2 | 0.2 | 0.2 | 0.2 | 0.2 | wherein said glass has a refractive index of $1.73 \leq n_d \leq 1.82$ and an Abbé value of $43 \leq v_d \leq 53$, and is lead and arsenic-free.

* * * * *

UNITED STATES PATENT AND TRADEMARK OFFICE
CERTIFICATE OF CORRECTION

PATENT NO. : 7,297,647 B2 Page 1 of 1
APPLICATION NO. : 11/067495
DATED : November 20, 2007
INVENTOR(S) : Silke Wolff It is certified that error appears in the above-identified patent and that said Letters Patent is hereby corrected as shown below:

Column 7, line 49, reads "0 to 5" should read -- 0.1 to 5 --

Signed and Sealed this

Twentieth Day of May, 2008

JON W. DUDAS
*Director of the United States Patent and Trademark Office*